United States Patent
Mandai et al.

Patent Number: 5,914,691
Date of Patent: Jun. 22, 1999

[54] ANTENNA APPARATUS HAVING MAGNETIC-CURRENT-TYPE AND ELECTRIC-FIELD TYPE ANTENNA

[75] Inventors: Harufumi Mandai, Takatsuki; Teruhisa Tsuru, Kameoka, both of Japan

[73] Assignee: Murata Manufacturing Co., Ltd., Japan

[21] Appl. No.: 08/886,651

[22] Filed: Jul. 1, 1997

[30] Foreign Application Priority Data

Jul. 2, 1996 [JP] Japan .................................. 8-172507

[51] Int. Cl.⁶ ...................................................... H01Q 21/00
[52] U.S. Cl. .................................. 343/728; 343/702
[58] Field of Search .................................. 343/728, 702, 343/726, 725, 729; 455/277.2

[56] References Cited

U.S. PATENT DOCUMENTS 4,633,519  12/1986  Gotoh et al. .......................... 455/277
5,767,811  6/1998  Mandai et al. ........................ 343/702

Primary Examiner—Robert Kim
Assistant Examiner—Tu T. Nguyen
Attorney, Agent, or Firm—Ostrolenk, Faber, Gerb & Soffen, LLP

[57] ABSTRACT

An antenna apparatus includes a magnetic-current-type antenna, an electric-field-type antenna, and switch. The magnetic-current-type antenna and the electric-field-type antenna are switched according to use conditions by the switch.

3 Claims, 3 Drawing Sheets

DISTANCE BETWEEN ANTENNA AND USER

DISTANCE BETWEEN ANTENNA AND USER

DISTANCE BETWEEN ANTENNA AND USER

ANTENNA APPARATUS HAVING MAGNETIC-CURRENT-TYPE AND ELECTRIC-FIELD TYPE ANTENNA

BACKGROUND OF THE INVENTION

1. Field of the Invention

The present invention relates to antenna apparatus, and more particularly, to an antenna apparatus used for mobile communication units such as a portable phone and a pager.

2. Description of the Related Art

In a conventional mobile communication unit, for example, in a pager, a magnetic-current-type antenna, typical of which is a loop antenna, is used so as not to be an obstacle during operation.

Since the above-described magnetic-current-type antenna is conventionally used, however, if the distance between the antenna and the user is about $3\lambda/16$, sensitivity decreases by about 5 to 6 dB, as shown in FIG. 6, and if the distance between the antenna and the user is about $\lambda/4$, sensitivity deteriorates by 10 dB or more. With a pager using the 280-MHz band, for example, since $\lambda$ is equal to about 100 cm, sensitivity decreases by about 5 to 6 dB when the distance between the antenna and the user is about 20 cm, and sensitivity deteriorates by 10 dB or more when the distance between the antenna and the user is about 25 cm. Therefore, a radio wave may not be received under certain use conditions.

SUMMARY OF THE INVENTION

Accordingly, it is an object of the present invention to provide an antenna apparatus which always allows transmission and receiving irrespective of use conditions.

The foregoing object is achieved according to the present invention through the provision of an antenna apparatus including a magnetic-current-type antenna; an electric-field-type antenna having the same resonant frequency as the magnetic-current-type antenna; and a switch wherein the magnetic-current-type antenna and the electric-field-type antenna are switched by the switch.

Since the antenna apparatus includes the magnetic-current-type antenna, the electric-field-type antenna, and the switch the two types of the antennas can be switched according to sensitivity. Therefore, excellent sensitivity in transmission and receiving can always be achieved irrespective of use conditions.

In the antenna apparatus, the electric-field-type antenna may be a chip antenna including a base member made from at least one of a dielectric material and a magnetic material; at least one conductor formed on a surface or on the inside of the base member or both; and at least one feeding terminal formed on a surface of the base member in order to apply a voltage to the conductor.

Since the antenna apparatus uses the small chip antenna as an electric-field-type antenna in which the conductor is provided inside the base member made from at least one of a dielectric material and a magnetic material, a mobile communication unit such as a pager is made compact.

Since the chip antenna is mounted inside a mobile communication unit, the antenna is not an obstacle during operation, and the unit becomes easier-to-use.

Since an antenna apparatus according to the present invention includes a magnetic-current-type antenna in which the antenna sensitivity increases when the user approaches the antenna to be within $\lambda/8$ or when the user is away from the antenna by $3\lambda/8$ or more, an electric-field-type antenna in which the antenna sensitivity increases when the distance between the user and the antenna is within the range of $\lambda/8$ to $3\lambda/8$, and switching means for switching the two types of antennas, the two types of antennas can be switched according to the antenna sensitivity.

Other features and advantages of the present invention will become apparent from the following description of the invention which refers to the accompanying drawings.

DETAILED DESCRIPTION OF EMBODIMENTS OF THE INVENTION

Figure 1:
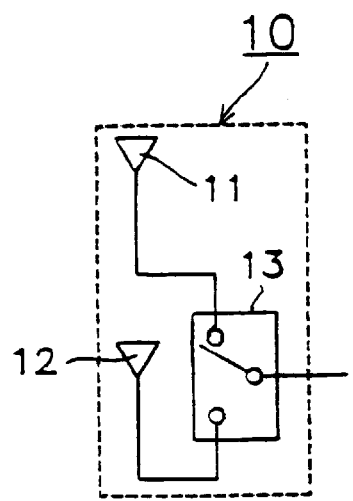
FIG. 1 is a circuit diagram of an antenna apparatus according to a first embodiment of the present invention.

Embodiments of the present invention will be described below by referring to the drawings.

FIG. 1 is a block diagram of an antenna apparatus according to a first embodiment of the present invention. An antenna apparatus 10 includes a magnetic-current-type antenna 11, an electric-field-type antenna 12, and switching means 13. The magnetic-current-type antenna 11 and the electric-field-type antenna 12 can be switched according to use conditions by the switching means 13.

Figure 2:
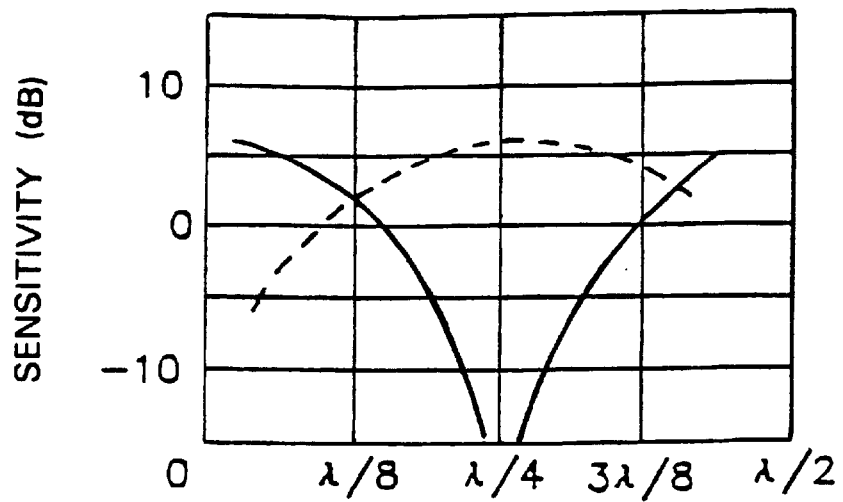
FIG. 2(a) is a chart indicating the sensitivity of each of a magnetic-current-type antenna and an electric-field-type antenna.
FIG. 2(b) is a chart indicating the sensitivity of the antenna apparatus shown in FIG. 1.
Figure 2:
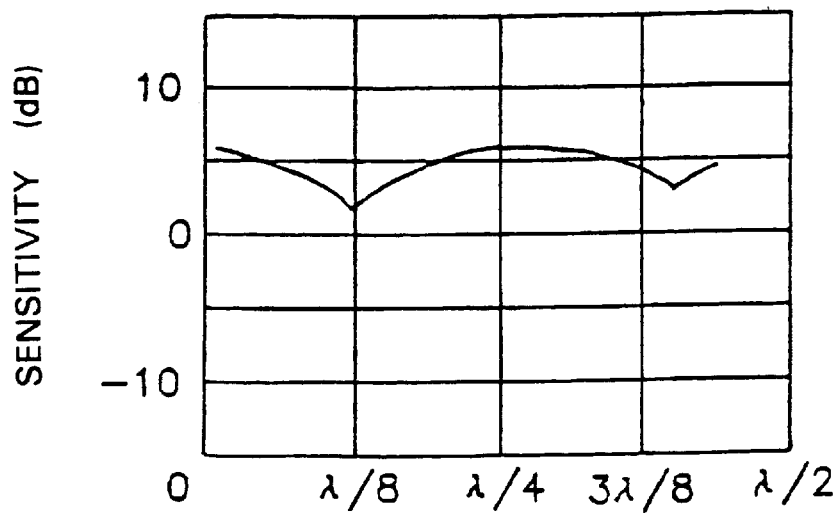

FIG. 2(a) shows the relationships between the distance from the user and antenna sensitivity for the magnetic-current-type antenna 11 and the electric-field-type antenna 12. The solid line indicates the relationship for the magnetic-current-type antenna 11 and the dotted line indicates the relationship for the electric-field-type antenna 12.

It is understood from the figure that the sensitivity characteristics of the magnetic-current-type antenna 11 and the electric-field-type antenna 12 show that they are the reverse of each other with respect to the distance from the user. In other words, the sensitivity of the magnetic-current-type antenna 11 increases when the antenna approaches the user to be within $\lambda/8$ for a received frequency or when the antenna is away from the user by $3\lambda/8$ or more, and the sensitivity deteriorates when the antenna is away from the user by about $\lambda/4$. In contrast, the sensitivity of the electric-field-type antenna 12 increases when the antenna is disposed in the range of $\lambda/8$ to $3\lambda/8$ from the user but deteriorates when the antenna approaches the user to be within $\lambda/8$ or when the antenna is away from the user by $3\lambda/8$ or more.

FIG. 2(b) shows the sensitivity of the antenna apparatus in which the magnetic-current-type antenna 11 and the electric-field-type antenna 12 are switched. In other words, the magnetic-current-type antenna 11 is used when the antenna apparatus approaches the user to be within $\lambda/8$ or when the antenna apparatus is away from the user by $3\lambda/8$ or more, and the electric-field antenna 12 is used when the antenna apparatus is disposed in the range of λ/8 to 3λ/8 from the user. With a pager using the 280-MHz band, for example, since λ is equal to about 100 cm, the magnetic-current antenna 11 is used when the pager approaches the user within 20 cm, or when the pager is away from the user by 37.5 cm or more, and the electric-field-type antenna 12 is used when the pager is disposed in the range of 20 to 37.5 cm from the user.

As described above, since the antenna apparatus is formed by the magnetic-current-type antenna, the electric-field-type antenna, and the switching means, the two types of antennas can be switched according to the antenna sensitivity. Therefore, transmission and receiving can always be done at high sensitivity irrespective of use conditions.

Figure 3:
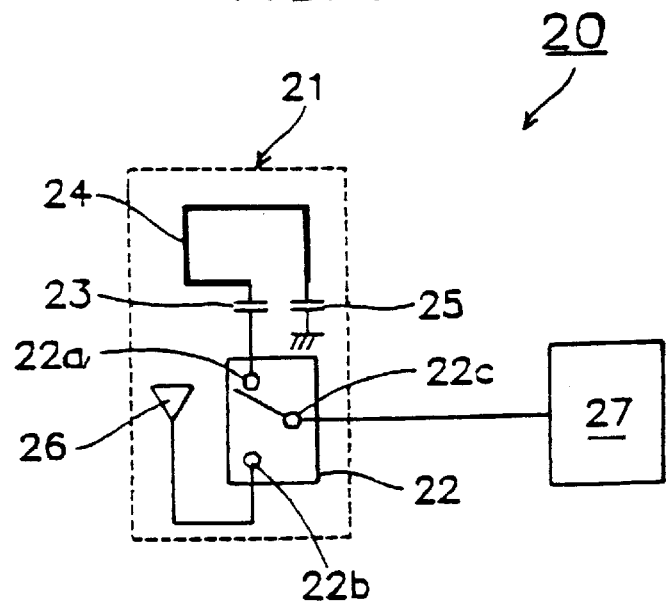
FIG. 3 is a circuit diagram of an antenna apparatus according to a second embodiment of the present invention.

FIG. 3 is a circuit diagram of an antenna apparatus according to a second embodiment of the present invention. This is a case in which a pager is used as a mobile communication unit in which an antenna apparatus is used.

An antenna apparatus 21 mounted on a pager 20 includes a switch 22 serving as switching means, a first capacitor 23 connected in series between a first port 22a of the switch 22, a loop antenna 24 serving as a magnetic-current-type antenna, a second capacitor 25 and ground and a chip antenna 26 serving as an electric-field-type antenna connected to a second port 22b of the switch 22. A third port 22c of the switch 22 is connected to an RF circuit section 27 of the pager 20. The first and second capacitors 23 and 25 are connected in order for impedance matching and frequency adjustment for the loop antenna 24.

Figure 4:
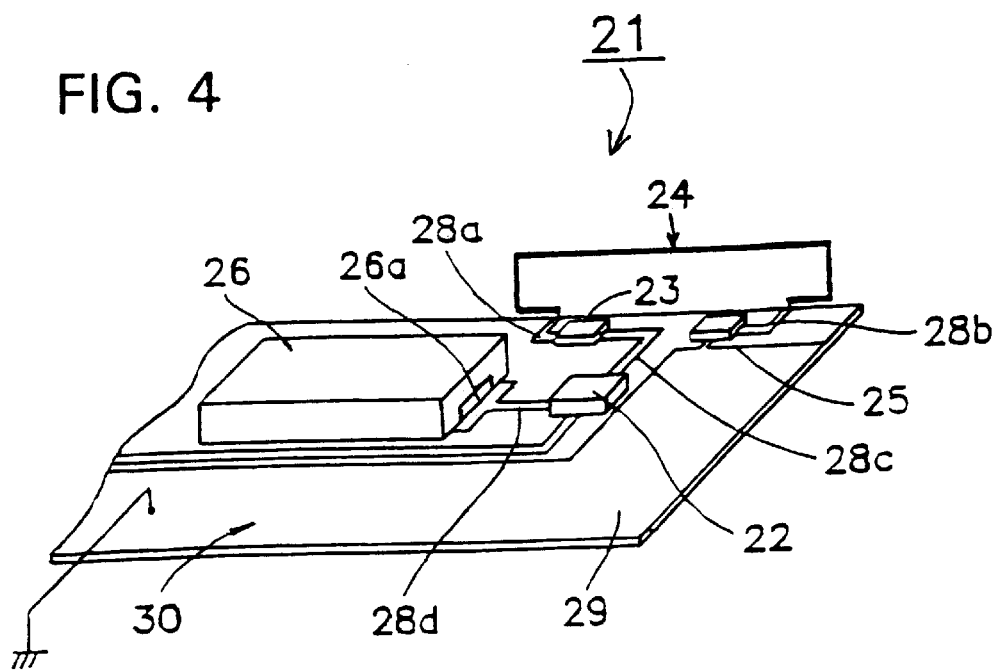
FIG. 4 is a perspective view of the antenna apparatus shown in FIG. 3.

FIG. 4 is a perspective view of the antenna apparatus 21 according to the second embodiment. This antenna apparatus 21 is configured by mounting the loop antenna 24, the chip antenna 26, the switch 22, and the first and second capacitors 23 and 25 on a mounting board 30 in which transmission lines 28a to 28d and a ground electrode 29 are formed on its surface.

One end of the loop antenna 24 is connected to the transmission line 28a and the other end is connected to the transmission line 28b. The first capacitor 23 is connected between the transmission line 28a and the transmission line 28c, and the second capacitor 25 is connected between the transmission line 28b and the ground electrode 29.

A feeding terminal 26a of the chip antenna 26 is connected to the transmission line 28d. The first port of the switch 22 is connected to the transmission line 28c, the second port is connected to the transmission line 28d, and the third port is connected to the RF circuit section, not shown, of the pager.

In receiving, a signal received by the loop antenna 24 or the chip antenna 26 is transferred to the RF circuit section of the pager 20 through the switch 22. In transmission, a signal from the RF circuit section of the pager is transferred to the loop antenna 24 or the chip antenna 26 through the switch 22 and is transmitted.

Figure 5:
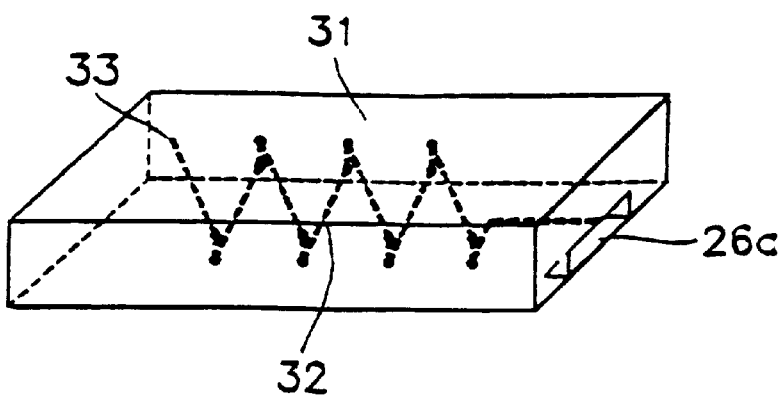
FIG. 5 is a perspective view of a chip antenna used for the antenna apparatus shown in FIG. 3.
Figure 6:
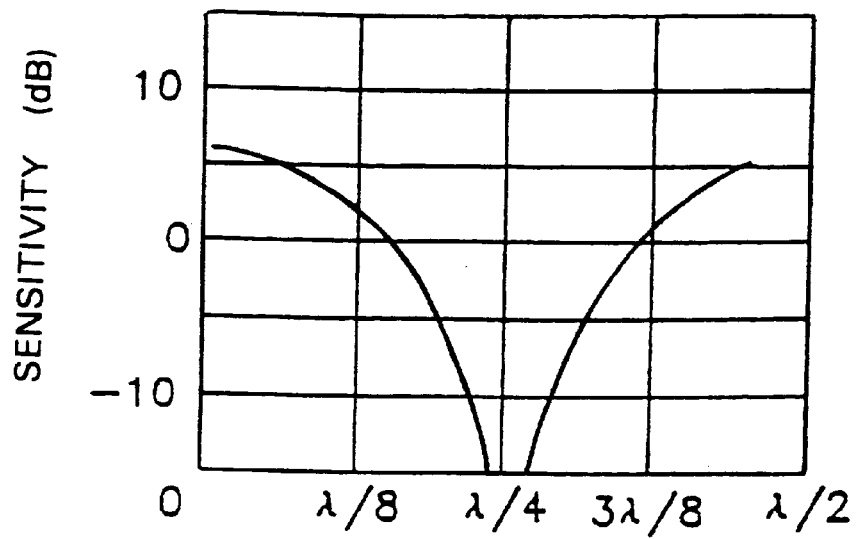
FIG. 6 is a chart indicating the sensitivity of a conventional antenna.

FIG. 5 is a perspective view of the chip antenna used for the antenna apparatus 21 according to the second embodiment. The chip antenna 26 includes, inside a rectangular-parallelopiped base member 31 having barium oxide, aluminum oxide, and silica as main components, a conductor 32 helically wound in the longitudinal direction of the base member 31 and a feeding terminal 26a provided at a surface of the base member 31 for applying a voltage to the conductor 32. One end of the conductor 32 is connected to the feeding terminal 26a, and the other end serves as a free end 33 inside the base member 31.

As described above, since the small chip antenna in which the conductor is provided inside the base member made from a dielectric material is used as an electric-field-type antenna in the second embodiment of the present invention, in addition to the advantage obtained in the first embodiment, a mobile communication unit such as a pager is made compact.

Since a chip antenna can be put inside a mobile communication unit, the antenna is not an obstacle to operation of the unit.

In the first and second embodiments, one magnetic-current-type antenna and one electric-field-type antenna are used. More than two of each of them may be mounted. In this case, a plurality of resonant frequencies are handled.

In the above embodiments, the loop antenna is used as a magnetic-current-type antenna and the helical chip antenna is used as an electric-field-type antenna. Other antennas can be used, such as a reverse F antenna as a magnetic-current-type antenna and a monopole antenna as an electric-field-type antenna.

In the second embodiment, the base member of the chip antenna is made from a dielectric material, but it is not limited to a dielectric material. It may be a magnetic material or a combination of a dielectric material and a magnetic material.

As a switch, a high-frequency switch formed by a multi-layer substrate made from a dielectric material may be used. In this case, since the base member of the chip antenna and the multi-layer substrate of the switch can be combined into one substrate, the antenna apparatus is made more compact.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. An antenna apparatus comprising:
   a magnetic-current-type antenna;
   an electric-field-type antenna having the same resonant frequency as said magnetic-current-type antenna; and
   a switch coupled to the magnetic-current-type antenna and to the electric-field-type antenna;
   said magnetic-current-type antenna and said electric-field-type antenna being switched by said switch; and further wherein said electric-field-type antenna is a chip antenna including a base member made from at least one of a dielectric material and a magnetic material, at least one conductor formed on a surface or inside said base member or both, and at least one feeding terminal formed on a surface of said base member in order to apply a voltage to said conductor.

2. The antenna apparatus of claim 1, wherein the magnetic-current-type antenna comprises a loop antenna.

3. The antenna apparatus of claim 2, wherein the loop antenna is compacitively coupled between the switch and ground.

* * * * *